(12) United States Patent
Kulbaba (10) Patent No.: US 7,720,922 B2
(45) Date of Patent: May 18, 2010

(54) EMAIL CONTENT BUILDER SYSTEM AND METHOD

(75) Inventor: Walter Frank Kulbaba, Savage, MN (US)

(73) Assignee: Digital River, Inc., Eden Prairie, MN (US)

( * ) Notice: Subject to any disclaimer, the term of this patent is extended or adjusted under 35 U.S.C. 154(b) by 142 days.

(21) Appl. No.: 11/925,417

(22) Filed: Oct. 26, 2007

(65) Prior Publication Data

US 2008/0140701 A1 Jun. 12, 2008

Related U.S. Application Data (60) Provisional application No. 60/869,477, filed on Dec. 11, 2006.

(51) Int. Cl.
*G06F 15/13* (2006.01)

(52) U.S. Cl. .................. 709/206; 709/202; 709/203; 709/204; 455/466

(58) Field of Classification Search .................. 709/202, 709/203, 205, 206; 455/466
See application file for complete search history.

(56) References Cited

U.S. PATENT DOCUMENTS

| | | | |
|---|---|---|---|
| 4,837,798 A | 6/1989 | Cohen et al. | |
| 4,910,765 A | 3/1990 | Matsuse et al. | |
| 5,381,523 A | 1/1995 | Hayashi | |
| 5,513,126 A | 4/1996 | Harkins et al. | |
| 5,630,060 A | 5/1997 | Tang et al. | |
| 5,740,231 A | 4/1998 | Cohn et al. | |
| 5,781,186 A | 7/1998 | Jennings | |
| 5,848,415 A | 12/1998 | Guck | |
| 5,987,480 A | 11/1999 | Donohue et al. | |
| 6,034,970 A | 3/2000 | Levac et al. | |
| 6,073,165 A | 6/2000 | Narasimhan et al. | |
| 6,119,137 A | 9/2000 | Smith et al. | |
| 6,157,945 A | 12/2000 | Balma et al. | |
| 6,167,441 A | 12/2000 | Himmel | |
| 6,212,550 B1 | 4/2001 | Segur | |
| 6,295,058 B1 | 9/2001 | Hsu et al. | |
| 6,356,903 B1 | 3/2002 | Baxter et al. | |
| 6,732,331 B1 | 5/2004 | Alexander | |
| 6,816,885 B1 | 11/2004 | Raghunandan | |
| 6,832,244 B1 | 12/2004 | Raghunandan | |
| 6,931,428 B2 | 8/2005 | Peddu et al. | |
| 7,096,276 B2 | 8/2006 | Bodin et al. | |
| 7,149,964 B1 | 12/2006 | Cottrille et al. | |
| 7,178,099 B2 | 2/2007 | Meyer et al. | |
| 7,178,101 B2 | 2/2007 | Tunning | |
| 7,188,100 B2 | 3/2007 | De Bellis et al. | |
| 7,412,486 B1 * | 8/2008 | Petrack et al. | 709/206 |
| 7,428,580 B2 * | 9/2008 | Hullfish et al. | 709/207 |
| 2002/0105545 A1 | 8/2002 | Carter et al. | |
| 2002/0188688 A1 * | 12/2002 | Bice et al. | 709/206 |
| 2003/0009694 A1 | 1/2003 | Wenocur et al. | |
| 2008/0155024 A1 * | 6/2008 | Morris | 709/206 |

* cited by examiner

*Primary Examiner*—Jinsong Hu
(74) *Attorney, Agent, or Firm*—North Oaks Patent Agency; Shawn B. Dempster (57) ABSTRACT

An email content builder that generates email content based upon customer created rules is described. Messages to clients are edited automatically to suit a client's needs. The language in the text of a message is translated and changed depending on the country and client. Users select a script in an ebusiness system. After retrieving the appropriate script and associated information, the email content builder would either build the appropriate script corresponding to a client or retrieve appropriate text from the database. Then, the email content builder builds a script and email message depending on certain aspects of the client, such as language, billing information, etc.

11 Claims, 11 Drawing Sheets

EMAIL CONTENT BUILDER SYSTEM AND METHOD

This application claims the benefit of U.S. Provisional Application No. 60/869,477 filed Dec. 11, 2006, entitled "Email Content Builder," which is incorporated herein by reference.

FIELD OF THE INVENTION

The present invention relates to email systems and more specifically to an improved system and method of building email messages.

BACKGROUND OF THE INVENTION

Utilization of the Internet continues to rise at a rapid pace. Indeed, business and governmental entities as well as individuals are increasingly relying upon the Internet for research, communication, entertainment and transactional purposes. Access to the Internet network is provided by Internet servers. Such servers are typically maintained by an Internet Service Provider (ISP) who offers "use" of its servers to customers on a pre-determined, subscription basis. Basically, an ISP is a business or organization that sells access to the internet and other related services.

Furthermore, electronic mail (email) is used by many people. Recipients can also reply to or forward the email and can opt to include an attachment as part of a replying or forwarding function. Forwarding the email includes creating a new email that includes the contents of the original email to additional addressees & recipients. The forwarding party (i.e. the recipient of the original email) can also edit the email. Replying to the email includes forwarding the email to one or more of the other addresses and/or the sender of the email.

In addition, email allows mail messages to be exchanged between users of computers around the world and out of the world, to space shuttles and the International Space Station. Internet email in particular provides a standard communications mechanism for millions of computers connected to the Internet. In the early days of email, email messages were very limited in features. They were restricted to ASCII characters; they had maximum line lengths and maximum message lengths. Modern email messages, however, support digital objects comprising audio, video, and graphic images. The modern email standard for the Internet, initiated in 1992, is called MIME, an acronym for Multipurpose Internet Mail Extensions. MIME allows mail messages to contain multiple digital objects in a single message, text having unlimited line length or overall length, character sets other than ASCII (allowing non-English language messages), multi-font messages, and binary or application specific files. Email messages are delivered to email clients, software application programs capable of connecting to the Internet through mail servers and downloading email messages from electronic mailboxes maintained in email servers.

Access to information and movement around the Internet is enhanced through the use of hyperlinks ("links") within a web page's hypertext markup language (HTML). The link, which is typically a word in a text field or an image on a web page, acts as a path that moves a user from one web page address, Uniform Resource Locator (URL), to another web page address on a web site. The movement from one URL to another allows near-instant access to information, products, and services and is particularly well-suited to the exchange of information, goods, and services between buyers and sellers. Such business is commonly referred to as "e-commerce," or "electronic commerce."

The current state of e-commerce is a state of confusion; many people are losing a great deal of money. Only few make any profit, mostly due to a poor set of products and tools. For instance, there are credit card security issues, limited ways to pay for merchandise, older browser versions, and sites that do not update their catalogs. E-commerce web sites sell products, such as goods or services, online. They both display the products for sale and provide an easy way to complete a sales transaction. This usually involves credit card verification and automatic merchant account processing.

There are two levels of ecommerce sophistication: static and dynamic. In static, separate web pages exist for each product usually with a picture, a description, and a price. Each time the user wants to change product information they change the product's web page and upload it to the website. "Shopping Cart" functionality is a user-friendly feature and is included as standard equipment in every ecommerce hosting plan. If the user already has a website that they are happy with, and are only selling a small number of items, then a shopping cart application maybe suitable. A shopping cart enables the existing web site to take orders, and sends those orders to another application for processing. Usually, the user will have to add HTML code to the web site after every product description. (This is often referred to as "bolt-on" software.) The code will create buttons and boxes that will allow the customers to select colors, sizes and quantities, place an order, and check out. Most will allow the user to choose a design template and will then create product and category pages that already include shopping cart functions. The software generally includes a database so that adding products and updating product information requires no knowledge of HTML. The software can either be licensed outright, or rented by the month from an ASP.

These web sites can be free, meaning that there are no monthly hosting fees and there are no development costs; easy to use point-and-click templates are provided by the host. However, some costs are involved, such as per transaction fees and merchant account setup fees. In contrast, the dynamic ones have product information stored in a database and displayed dynamically per users' requests. These are never free; users must pay a monthly hosting fee and develop these sites professionally.

In addition, there are several different ways to receive funds online. A user can travel down the time-consuming yet intellectually rewarding path of building their own shopping cart. But if the user does not have programming muscles to flex, let alone the time to build something, a web storefront service maybe the way to go. When moving currency from one party to another is involved, the time, money, and craftiness needed to implement them varies.

Just as there are bodegas and high-fashion shops, there are a wide variety of store fronts. Web stores have a more uneven quality, however. Some of the poorly managed storefronts sell non-existing merchandise; lack photos where appropriate, have a lack of customer support, have hidden payment options, and employ non-electronic payment methods. The better sites have ease of searching for content, obvious pathways through the site, and frequently updated catalogs. Furthermore, they have a way to retract purchases easily, a way to confirm purchases via email or fax, and have a way to record problems.

Consumer goods can often be complex, with a product coming in different sizes, shapes, or colors. Moreover, each attribute (such as color) can have a number of options (such as green, blue, red, etc). Better software will allow an unlimited number of attributes and allow a merchant to define a store keeping unit (SKU) for each combination. A merchant may define different prices and assign different images to products that have attributes. When a customer selects a specific combination of options for such a product, the screen will change to show the merchant defined price and image for that specific SKU. Furthermore, for merchants that sell food items and non-food items, it is important to tax the order accordingly. Some software allows the merchant to define a product as either taxable or non-taxable and will calculate the total sales tax per order accordingly. Write-In-Attributes are particularly useful for merchants that sell custom products. An example of would be a company selling shirts with monograms. The customer could enter his or her monogram using the write-in-attribute. For the merchant selling hundreds to thousands of products, intuitive categorization of the product line is a must. Some software allows for an unlimited product hierarchy—others limit the number of subcategories. Merchants should make their products as easy as possible to find. Often this means putting one product in multiple categories. For optimal results, the user should be using every opportunity they have to draw customers to the web store and to increase conversions once they have a visitor.

There is a need for an invention that will enable e-commerce companies to combine their e-commerce platforms to reduce customer handling time and mistakes. Specifically, there is a need for reducing the number of scripts sent by e-business systems to the e-commerce platforms by incorporating a script builder engine into the process. The present invention provides a solution to these needs and other problems, and offers other advantages over the prior art.

BRIEF SUMMARY OF THE INVENTION

An email content builder that generates email content based upon customer created rules is described. In particular, messages to clients may be edited automatically to suit a client's needs. The language in the text of a message may be automatically translated and changed depending on the country and client. For instance, a user would select a script as they normally would in an e-business system. After retrieving the appropriate script and associated information, the email content builder would either build the appropriate script corresponding to a client, or retrieve appropriate text from the database. The user would utilize the email content builder to build a script and email message depending on certain aspects of the client, such as language, billing information, etc. This approach has numerous benefits. First, the number of scripts required to make the e-business work would dramatically decrease. A single set of scripts will be required to handle the issues concerning most clients. Furthermore, the problems where an agent uses client script A to handle the issue for client B will be greatly reduced. There will also be automatic branding of general pool messages and a reduction in the number of queues and routing rules for clients who have standard service levels. Increased quality of email responses and less overall maintenance is also a benefit.

Additional advantages and features of the invention will be set forth in part in the description which follows, and in part, will become apparent to those skilled in the art upon examination of the following or may be learned by practice of the invention.

DETAILED DESCRIPTION

Figure 1:
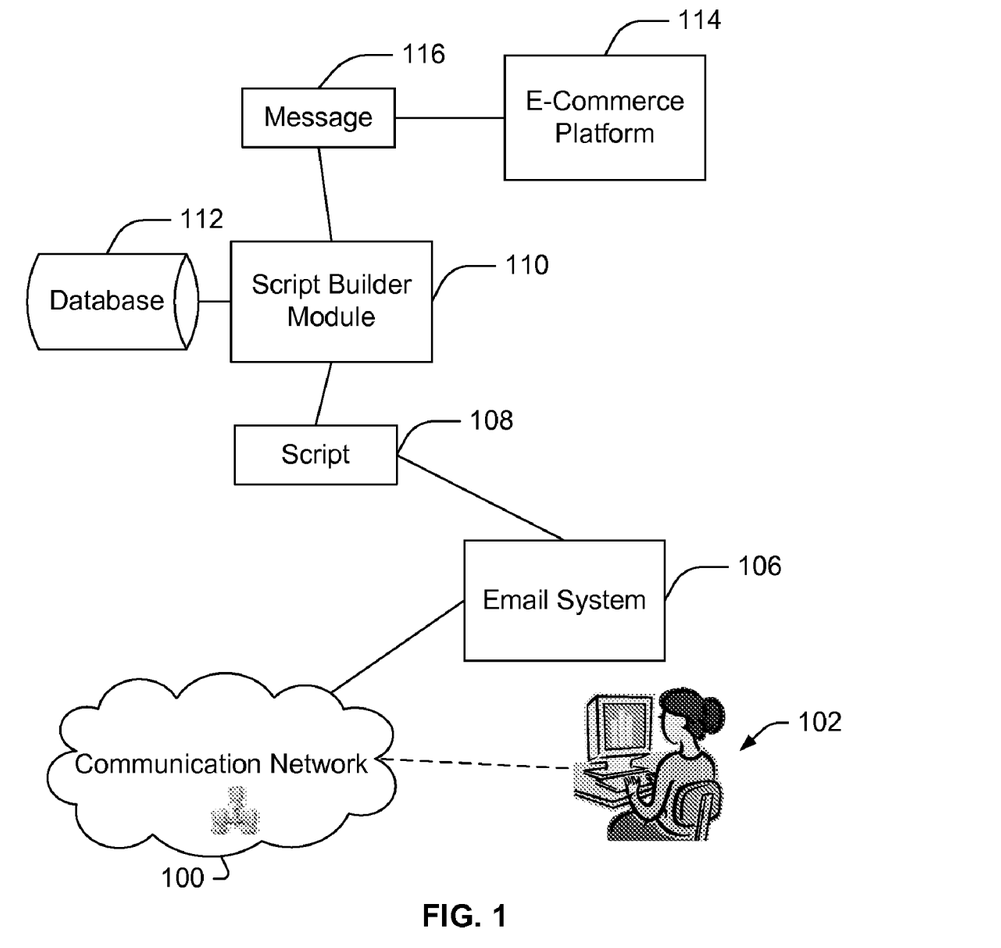
FIG. 1 illustrates an overview diagram of email content builder system and method.

Referring to FIG. 1, an example overview diagram of email content builder system and method is shown. A user 102 logs into an email system 106 over a communication network 100. The email system 106 may have a user interface (not shown). It will be understood by one of ordinary skill in the art that the user may be a customer, administrator, etc. The email system 106 is a generic term for any email program an ecommerce business wishes to utilize. Some examples include Kana, Yahoo, and Microsoft Outlook but are not limited to these examples. The user 102 can prepare a first message 108 to be sent to a particular ecommerce platform 114 by using a script builder module 110 that harnesses data from a database 112 to modify the first message 108 into a second message 116. The second message 116 is now created based upon the first message 108 and can be sent to ecommerce platform 114 thereby reducing the number of scripts sent to ecommerce platforms. This database 112 communicates bilaterally with the script builder module (also called engine) and also with the appropriate commerce platforms in order to generate scripts and customized messages. The email content builder system database 112 stores a variety of predetermined scripts. Scripts are typically a predetermined dialogue that the customer service representative (user) communicates to a customer, client, or other user. The script builder module also allows modifications of the predetermined scripts in order to better respond to customer inquiries. These scripts ultimately land in customized email responses and messages that are sent to customers based upon various rules or parameters for each client. These rules can be based on order IDs, commerce platform data, geographical locations, country, currency, and customer IDs.

Figure 2:
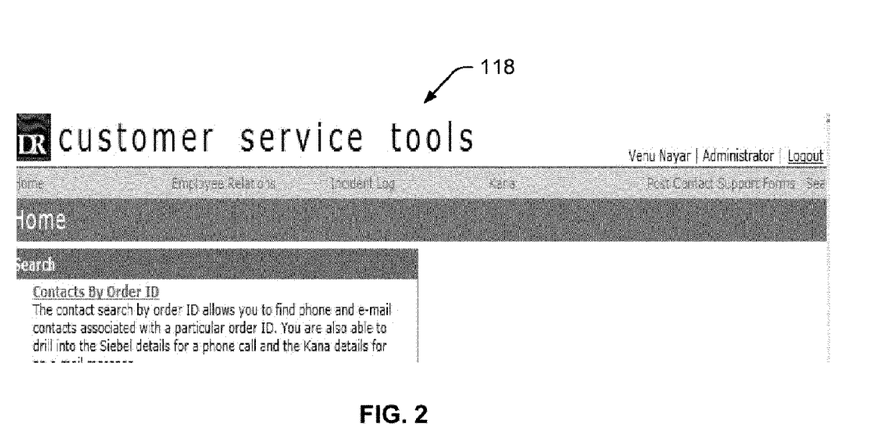
FIG. 2 shows a screen shot of the first screen in an administrative login for email content builder.

FIG. 2 shows a screen shot of the first screen 118 in an administrative login for email content builder. It will be understood by those skilled in the art that an ecommerce company may have several different platforms to perform its functions. For instance, Company "X" may have platform "A" to receive data on an Atlantic Ocean side of a country and a platform "B" to receive data on the Pacific Ocean side of a country. Due to the growing demand of customers and increase in customer service in general, the line of distinction between the "A" platform and "B" platform may grow finer every day. This poses a unique set of challenges.

First, existing "A" platform sites may be migrated to the "B" platform. This issue alone causes a number of problems. The channel used to contact customer service remains the same, and the average handle time increases as agents need to look up information in both platforms. Furthermore, the quality decreases as the probability of making mistakes increases. Second, reporting becomes more difficult as it is complicated to differentiate the contacts. In addition, if Company "X" has a majority of its new clients being set up on the "B" platform, the timeline for setting up new clients shrinks. Company "X" may not have the necessary tools to handle this migration.

Figure 3:
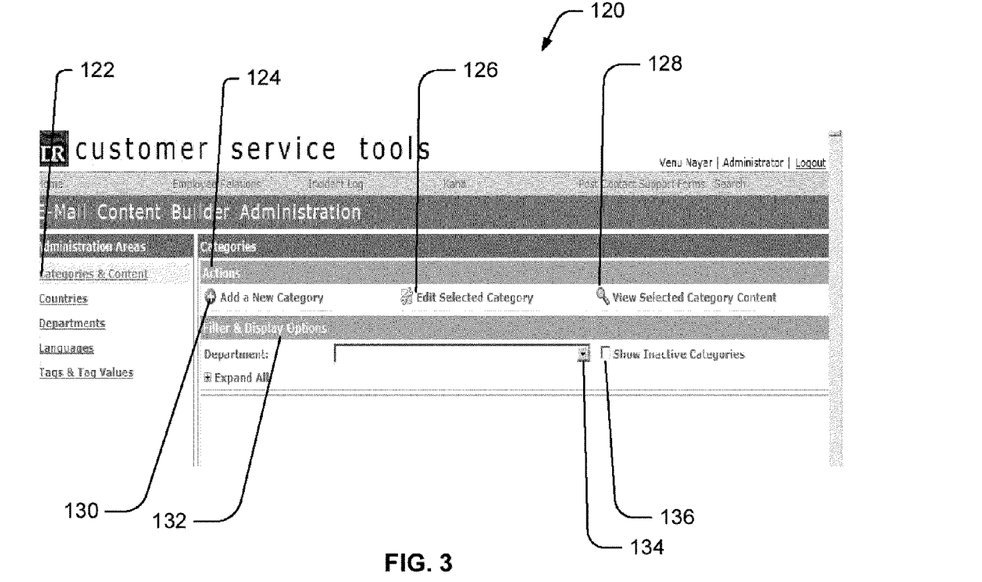
FIG. 3 shows a categories and content display box.

Accordingly, the email content builder would decrease the client handling time. The email content builder may take existing email messages and change the country, client, and language settings depending on a user's preferences. FIG. 3 shows a categories and content display page 120. It will be understood by one of ordinary skill in the art that category can be any collection of things sharing a common attribute. In this instance categories include commerce platforms. In a preferred embodiment, the user would choose a categories and content 122 option in an administration toolbar. Under actions 124, the user may add a new category 130, edit selected category 126, or view selected category content 128. Under filter and display options 132 the user can choose a commerce platform under department 134 dropdown menu. Show inactive categories box 136 can be checked to show the categories not in use.

Figure 4:
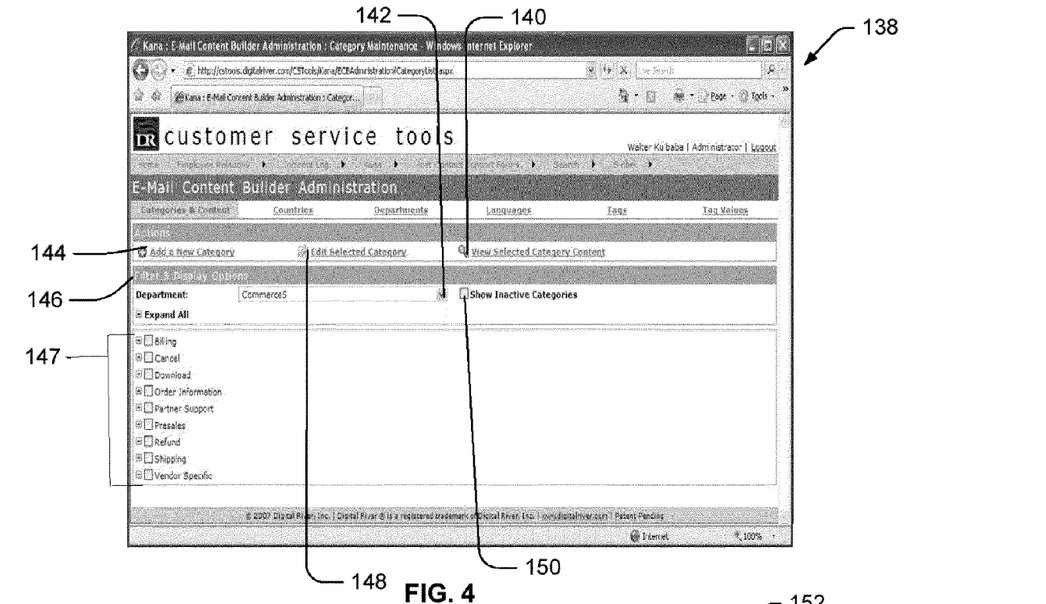
FIG. 4 shows options for category maintenance.

In another preferred embodiment, FIG. 4 shows a page for options 138 for category maintenance once the commerce platform from FIG. 3 is chosen. Again, the user may add a new category 144, edit selected category 148, or view selected category content 140. Under "Filter and Display Options" 146 the platform has been chosen in the dropdown menu 142. The user may edit billing, cancellation, downloading, order information, partner, presale, refund, shipping, and vendor specific data (collectively 147). It will be evident to one of ordinary skill in the art that these options 147 are not limited to those listed and may include other options pertinent to the user's requirements. Again the user can show inactive categories 150.

Figure 5:
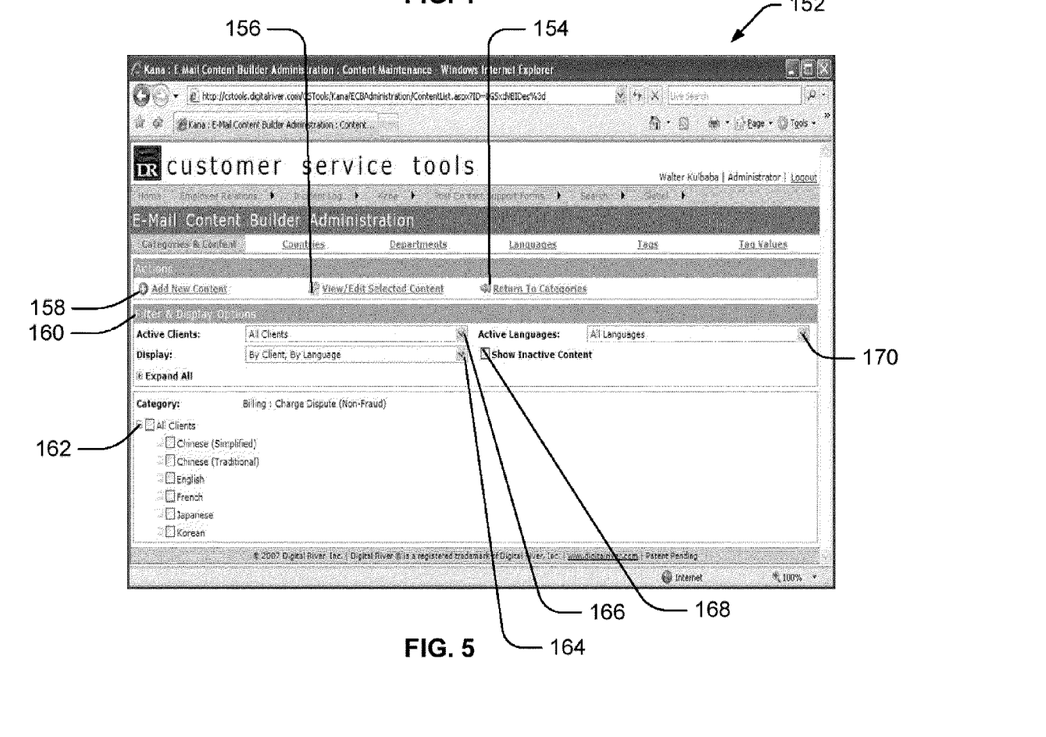
FIG. 5 illustrates a content box for choosing countries.

Referring now to FIG. 5, a content page for choosing languages 152 is illustrated. In a preferred embodiment of email content builder, the user may choose the active or inactive clients 166 and then display client categories 164 by language type. Active languages 170 can be chosen in the dropdown menu. Show inactive content 168 box can be checked to demonstrate unused content. The user can add new content 158, view/edit selected content 156, or return to the previous categories 154.

Again referring to FIG. 5 a billing category for charge dispute is displayed. The user may choose which language to display under all clients 162. Here, the languages of Chinese, English, French, Japanese, and Korean are shown. In summary, this page 152 is where the user would choose active clients and check languages per category for those clients.

Figure 6:
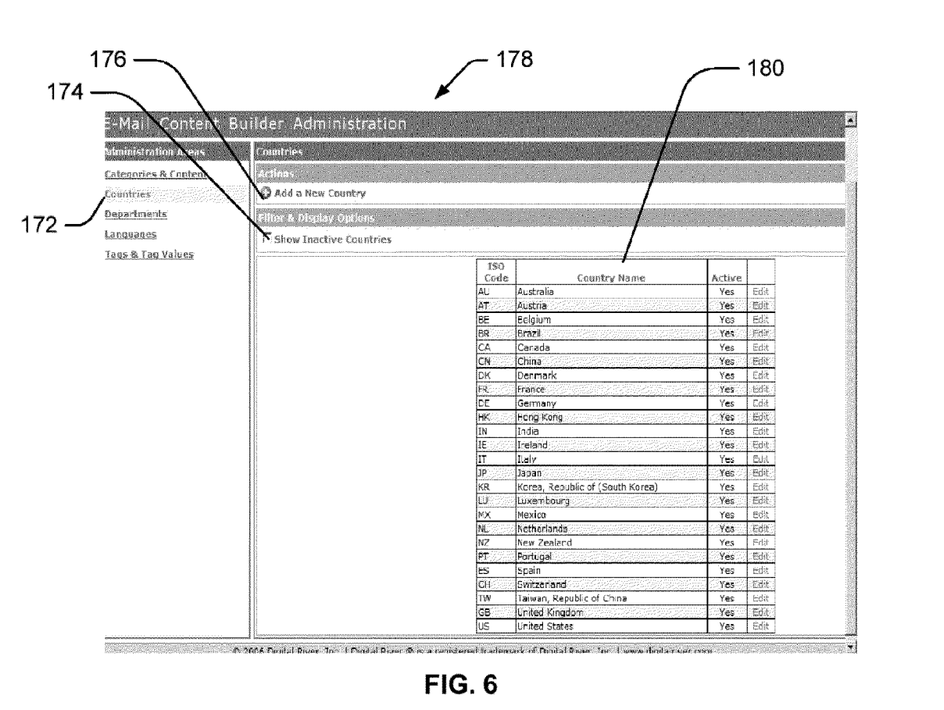
FIG. 6 illustrates a countries display box.

FIG. 6 illustrates a countries window 178. A countries option 172 is shown under the administration toolbar. Here the user may edit a list of countries 180 for displaying options. In another preferred embodiment, the user can add a new country 176 and show inactive countries 174 (by clicking icon or checking box, respectively). Under the list of countries 180, the user may edit the active status and other details for each country.

Figure 7:
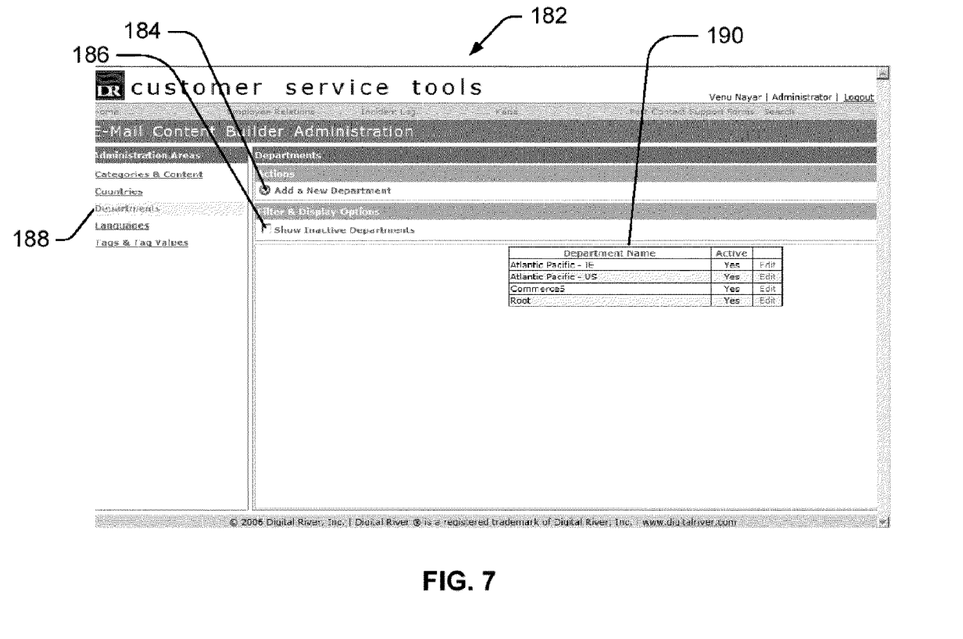
FIG. 7 illustrates a department box for choosing a department.

Additionally, FIG. 7 illustrates a department page 182 for choosing a department. It will be understood that an ecommerce company may have several different ecommerce platforms that would come under different departments. A departments option 188 is shown under the administration toolbar. The user can add a new department by selecting 184 or show inactive departments by checking box 186. A department table 190 shows the name and active statuses of different commerce platforms. The user may edit the active status and other details for each department.

Figure 8:
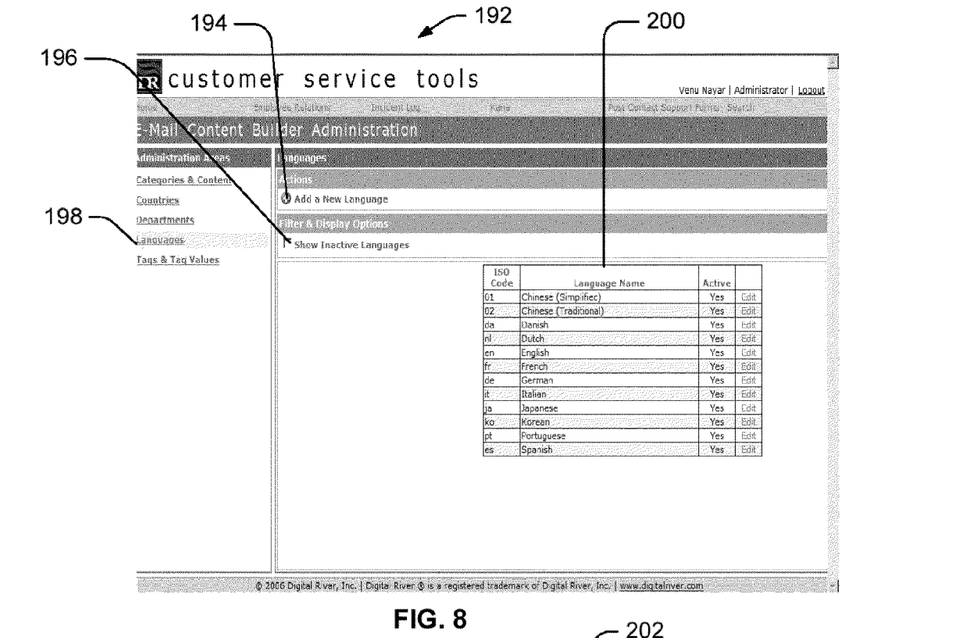
FIG. 8 illustrates a language window with options.

FIG. 8 illustrates a language window 192. A language option 198 is shown under the administration toolbar. The user may choose the language to display in a language table 200. Here the options of Chinese, Danish, Dutch, English, French, German, Italian, Japanese, Korean, Portuguese, and Spanish are shown. The user may edit the active status and other details for each language in table 200. Moreover, the user may add new languages 194 and show inactive languages 196. Thus, the user may create these rules or parameters in language that will ultimately predetermine a set of scripts stored within a commerce database. These predetermined scripts, or content, can be modified and used within a customized email message or response to a customer or client.

Figure 9:
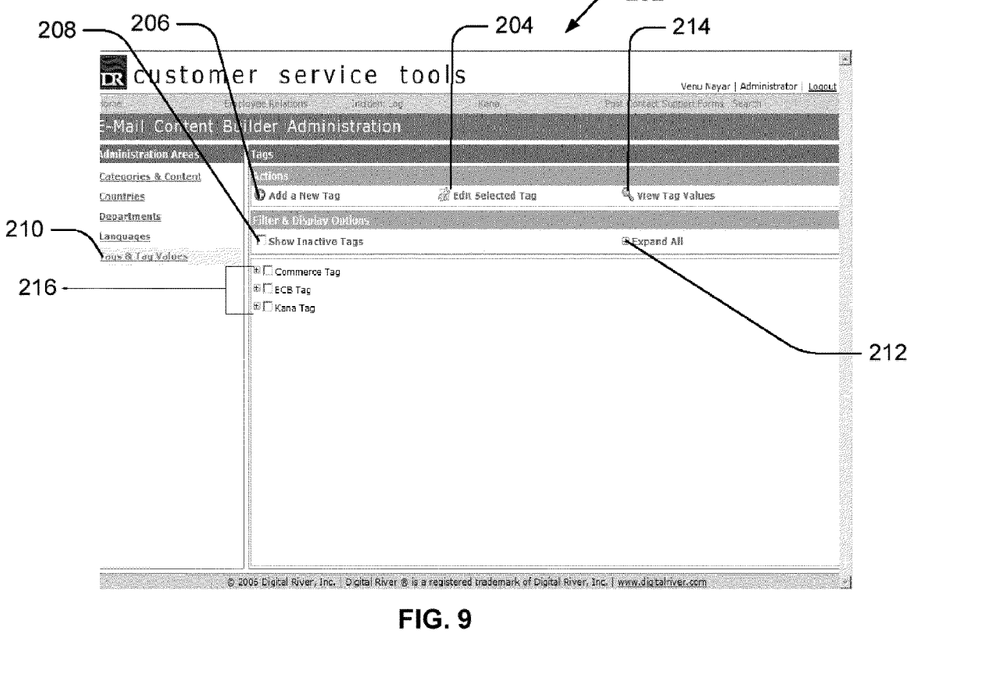
FIG. 9 shows a tags and tag value window.

Referring to FIG. 9, a tag and tag value window 202 is illustrated. In this window (also page) 202, the user can add new tags 206, edit selected tags 204, and view tag values 214. Under the administration toolbar a tag and tag values option 210 is displayed. The user may show inactive tags 208. Some tag options are shown collectively as 216. Here the user can expand all 212 or expand individually to edit commerce tags, email content builder tags, or Kana tags (for example).

Figure 10:
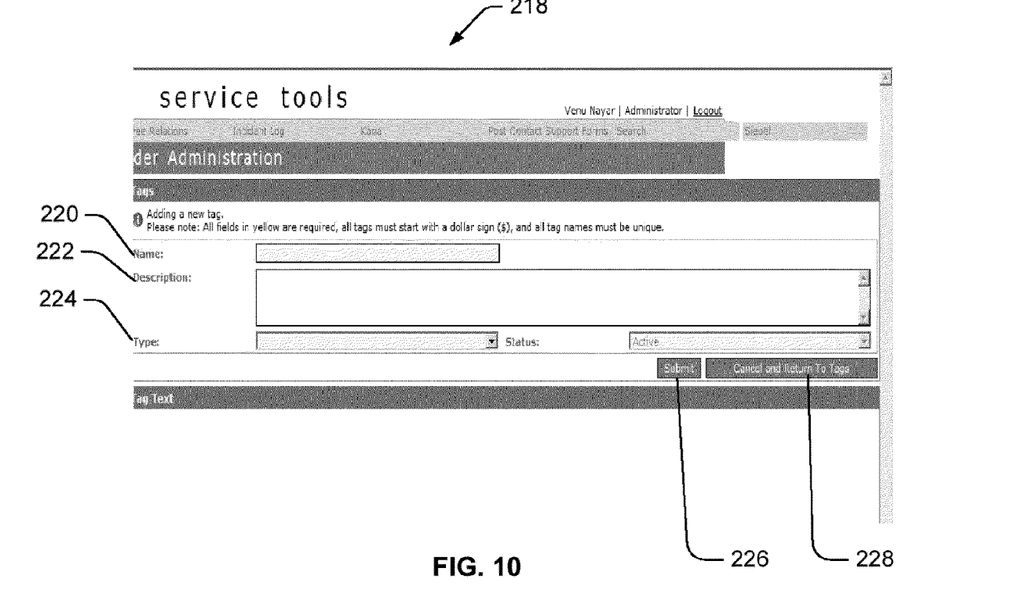
FIG. 10 shows a window for adding a new tag.

FIG. 10 illustrates an new tag page 218 where the user may add a name 220, description 222, and then choose a type 224 for each tag. Under type 224, the user can change the type name and the active status in the dropdown menus shown. After clicking on a "Submit" 226 button the user will have created a new tag. The user can cancel new tag addition by selecting cancel and return to tags 228 button. This button 228 would take the user back to the previous page, shown in FIG. 9.

Figure 11:
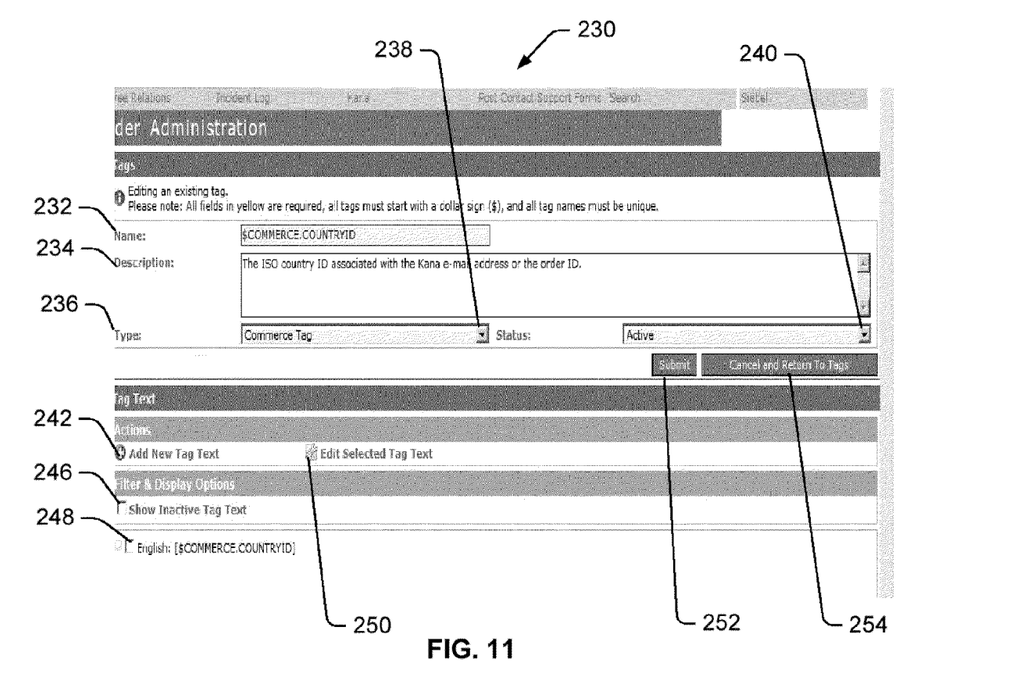
FIG. 11 shows a window for editing an existing tag.

Conversely, FIG. 11 shows a window 230 for editing an existing tag. The user may choose an existing tag from FIG. 9 and then change a name 232, description 234, type 236 and language settings 248 for the tag. Under type 236 the user may choose the tag 238 and active status 240 in the dropdown menus. FIG. 11 also shows add new tag test 242 icon, edit selected tag text 250 icon, and show inactive tag test 246 box. The user can select these if they wish to add new tag text currently with existing tag content. Clicking submit 252 will save the existing tag edits and selecting cancel and return to tags 254 will cancel the action.

Figure 12:
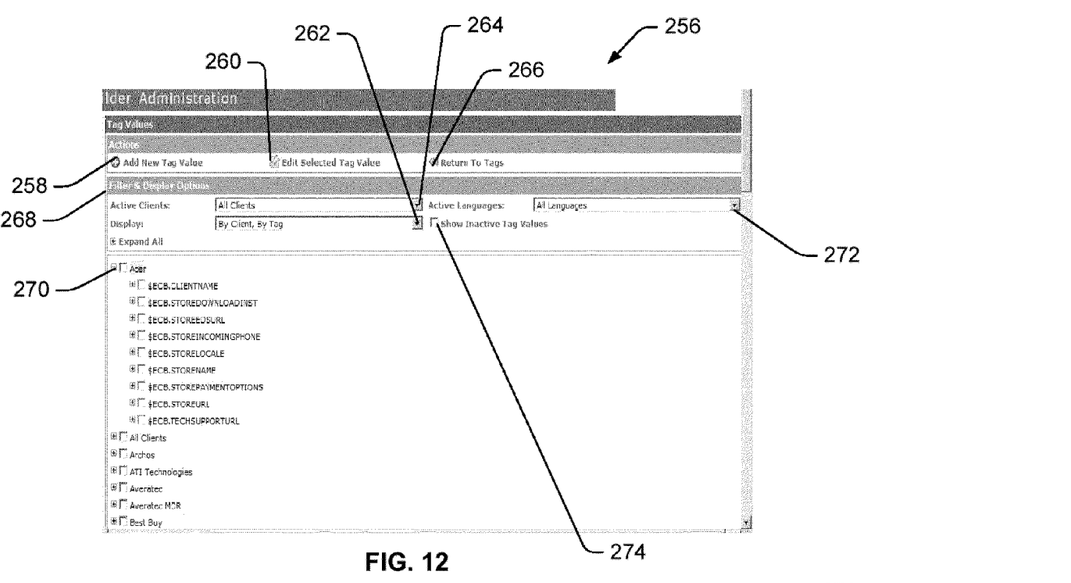
FIG. 12 shows a tag value window with an expanded client list.

Referring now to FIG. 12, a tag value window 256 is shown. Again in this window 256 the user may add new tag values 258, edit selected tag values 260, or return to previous tag page 266. Under filter and display options 268 the user may select under the drop down menu active clients 264, active languages 272, and display client tag 262. Checking show inactive tag values box 274 is also available on this page as with previous pages. The user may choose to expand the values listed under each client name 270 (shown as Acer for example). From this the user may choose to edit tag values for clients (See FIG. 13).

Figure 13:
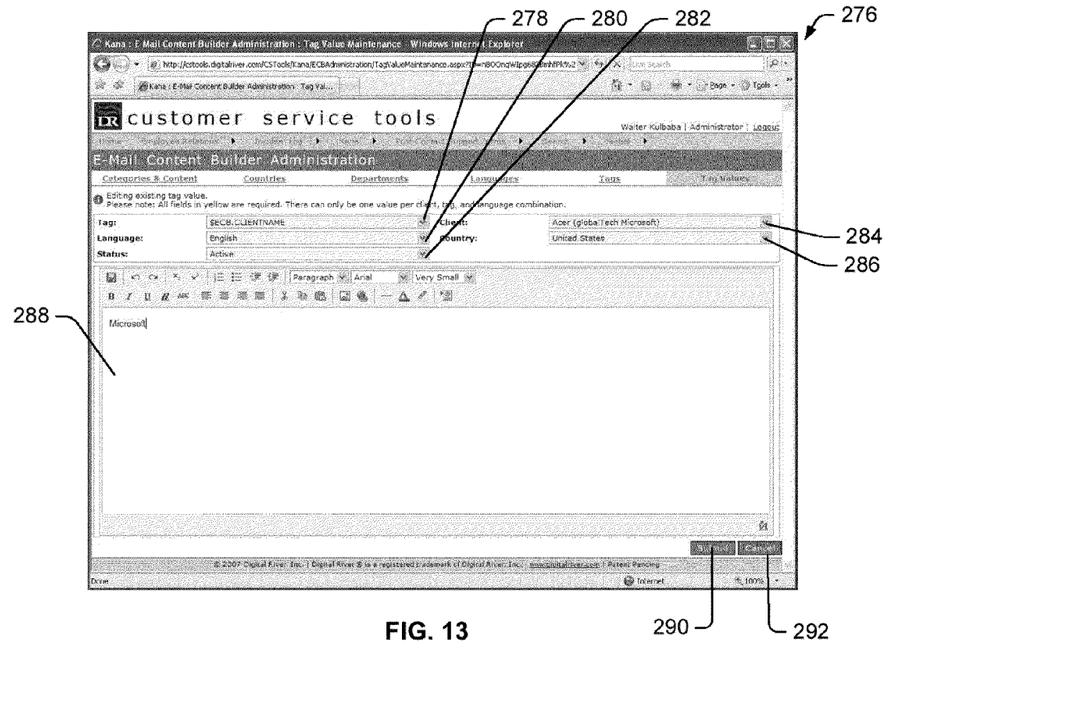
FIG. 13 shows a window for editing tag content.

Accordingly, FIG. 13 shows a page 276 for editing tag content. In a preferred embodiment, the user can change the language option and edit text. The tag is selected in dropdown menu 278, the language in dropdown menu 280, and the status in dropdown menu 282. The client is chosen in dropdown menu 284 and country in dropdown menu 286. In text window 288 the user can add the preferred text to the existing tag value along with any other edits such as font and size. Selecting submit 290 will save the existing tag value and selecting cancel 292 will stop the current action.

Figure 14:
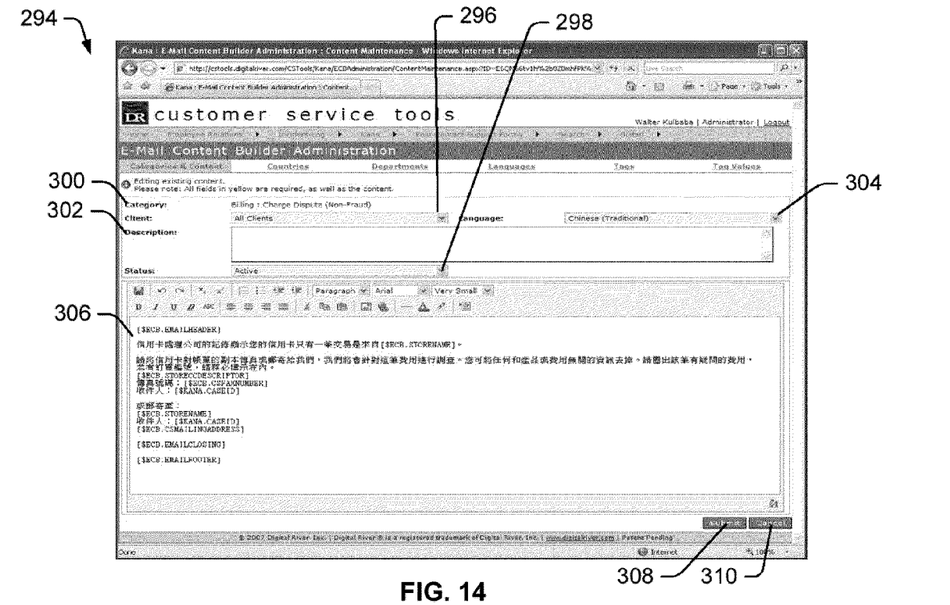
FIG. 14 illustrates a window for editing existing content.

FIG. 14 illustrates another page for editing existing content 294. Existing content can also be called predetermined scripts or emails that are stored within the script builder engine. Here, however, the language has been changed to Chinese. The user can see the selected category 300 and choose clients (under drop down menus 296). A language is selected from dropdown menu 304. A description is written in text box 302. Status is selected under dropdown menu 298. Finally, text window 306 is where the user can modify the preferred text to the existing content. Selecting submit 308 will save the existing content and selecting cancel 310 will stop the current action.

Figure 15:
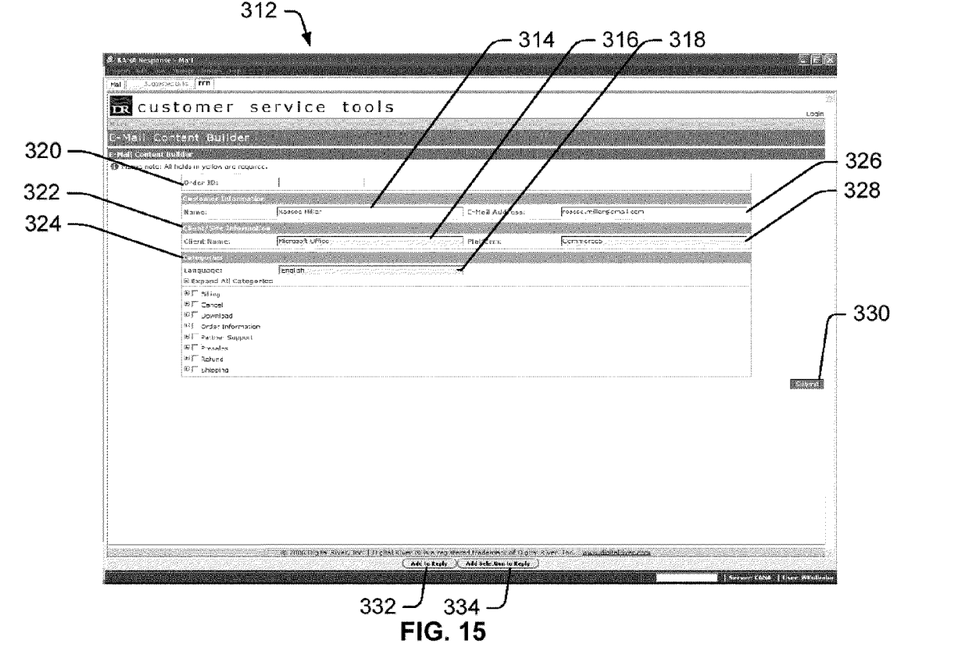
FIG. 15 illustrates a window for choosing categories in an email content builder.

FIG. 15 illustrates a page 312 for editing fields in a reply message. The user adds an order identification number (ID) 320, a customer name 314, an email address 326, a client name 316 and platform 328 under client/site information 322, and categories 324. Under categories 324 the user chooses a language 318 and clicks submit 330 to save the changes and add to reply 332 to add the current information to a reply message. Selecting add selection to reply 334 adds only selected content to the reply message.

Figure 16:
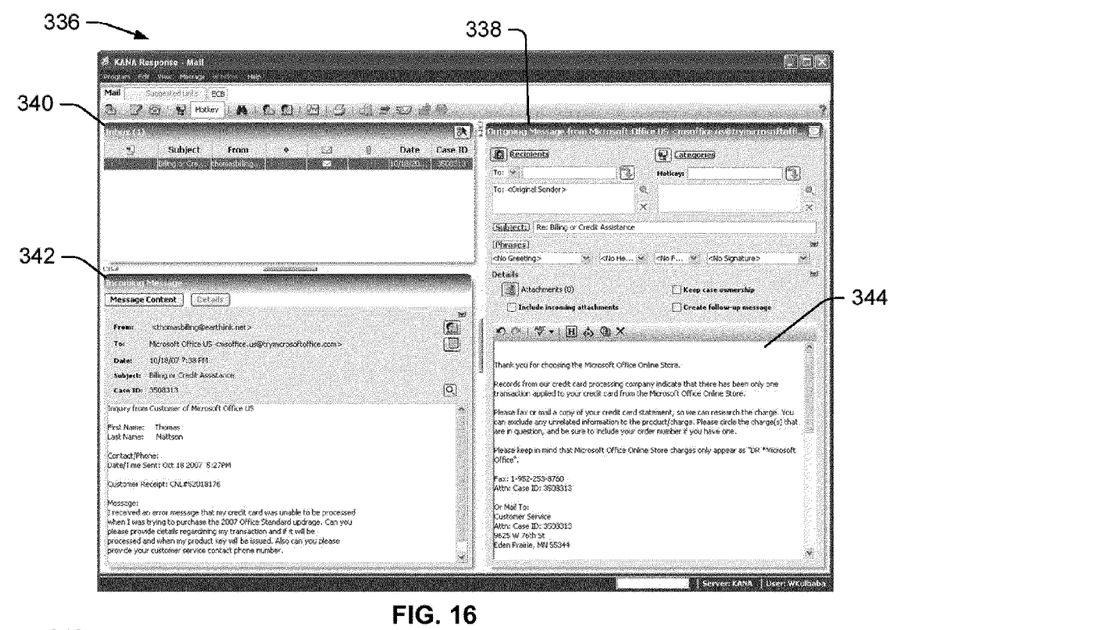
FIG. 16 shows an email system configured to work with an email content builder.
Figure 17:
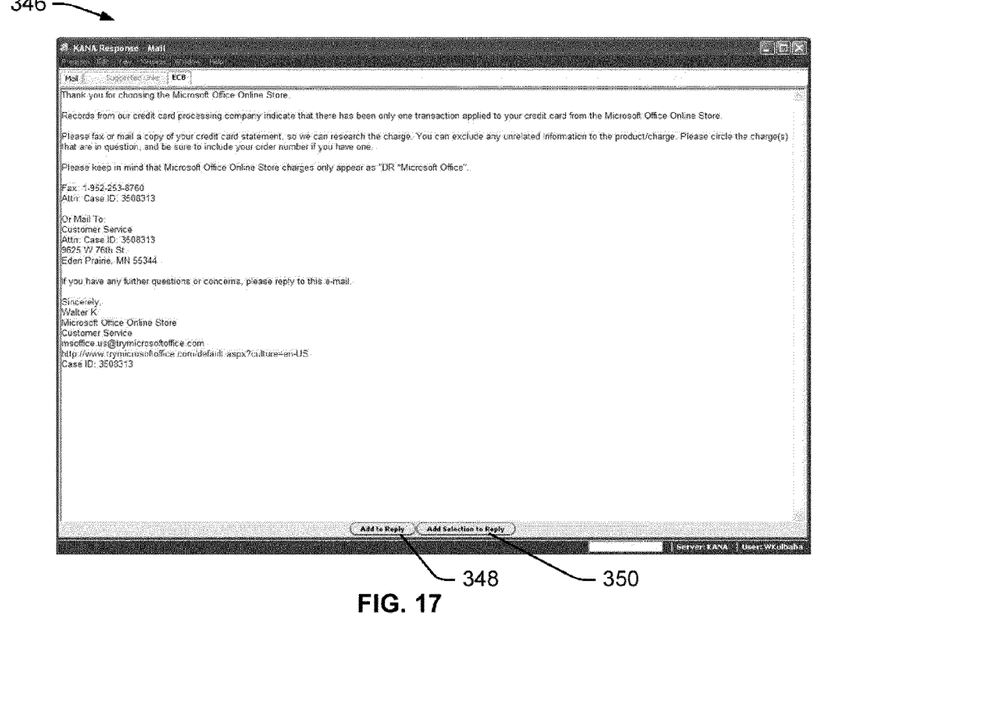
FIG. 17 shows an example email response generated from an email content builder.

FIG. 16 shows an email system configured to work with an email content builder. The page 336 shown is for editing message content in the email system. An inbox 340 stores messages and incoming message 342 is shown as well. Incoming message 342, for example, can be a customer complaint. Outgoing message 338 has fields and text box 344 for responding to the incoming message 342 and creating a response. Furthermore, FIG. 17 illustrates an example email response 346 generated from the email system configured to work with email content builder in FIG. 16. Add to reply 348 adds the current information to a reply message. Selecting add selection to reply 350 adds only selected content to the reply message.

Figure 18:
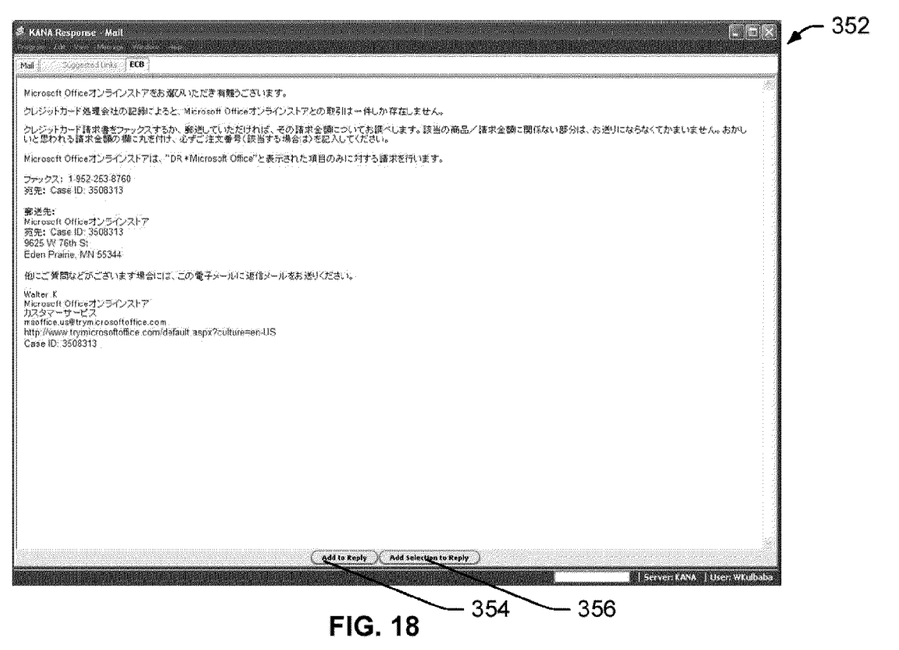
FIG. 18 shows the example email response of FIG. 17 changed to Japanese language.

Moreover, FIG. 18 shows the example email response of FIG. 17 changed to a response in the Japanese language 352. Email content builder system allows modifications of predetermined scripts in order to better respond to customer inquiries. FIG. 18 is an example of such modification based on language and other various parameters. This customized script would ultimately land in an email response message that is sent to a customer. Again, add to reply 354 adds the current information to a reply message and selecting add selection to reply 356 adds only selected content to the reply message with email content builder. This message in 353 is the ultimate goal of email content builder. The previous administrative screens modify and create the categories, departments, content, clients, statuses and tags that make the email message creation for various platforms and clients very easy. In a preferred embodiment, utilizing the email system, a customer representative can respond to several customer messages quickly and efficiently based on customized templates. If a customer is Chinese, the customer representative can (based on the language rules in the templates) to respond in Chinese. If the customer is part of a certain platform or department, the customer representative can respond according to that department (based in the category rules in the templates).

Figure 19:
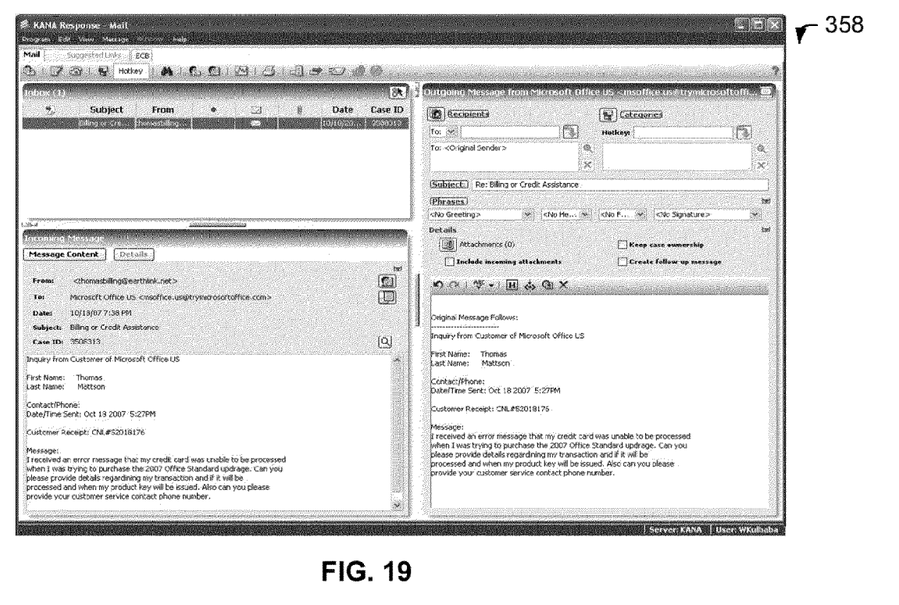
FIG. 19 shows another screen shot of an email system configured to work with an email content builder.

FIG. 19 shows another page 358 of the email system configured to work with email content builder. It will be understood by one of ordinary skill in the art that email systems vary and this page does not limit the type of email systems that would integrate and utilize email content builder system and method.

Figure 20:
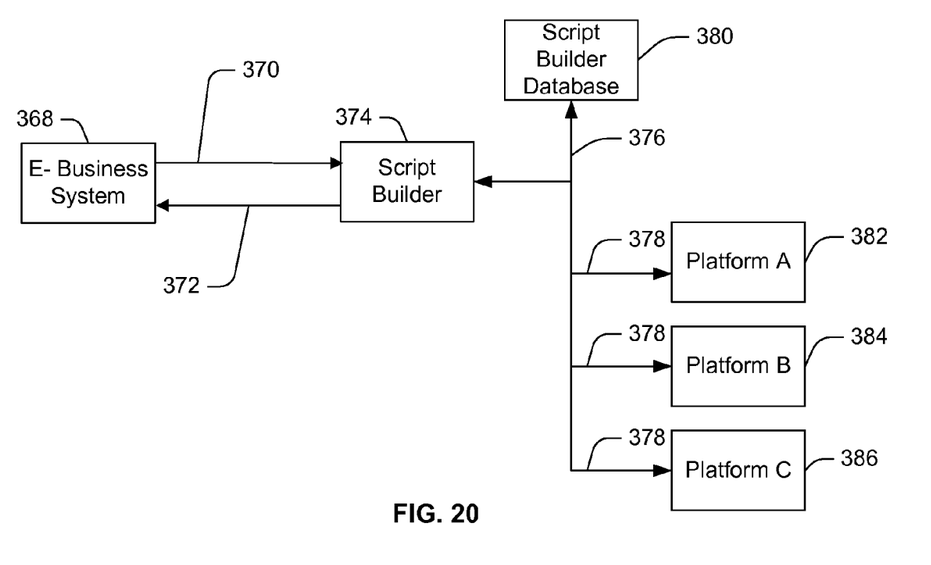
FIG. 20 shows a flow chart for the process of building email content.

Finally, FIG. 20 shows a flow chart for the preferred embodiment process of building email content. An ebusiness system 368 sends 379 incoming email addresses, languages, order IDs, and other information to a script builder engine 374. The script builder engine 374 in return sends 372 message body or text to the ebusiness system 368. The script builder engine 374 sends and receives 376 message body, text, and URL information to a script builder database 380. The script builder engine 374 also sends and receives 378 commerce data to various platforms A (382), B (384), and C (386). It will be understood that these platforms can be different sections of a company's ecommerce business located throughout the world. So, instead of having a separate script builder for each platform, there is one script builder engine 374 that organizes and generates templates based upon email and customer data found in the database 380. The script builder engine 374 works with the central ebusiness system 368, reducing any need for several customer service departments.

Another way of describing email content builder system and method is to say that a new integration point is developed that would take the users' request, and, based on a set of rules, would pull the order data from the appropriate commerce platform. The order data (and any other data) is stored in the database. This database communicates bilaterally with the script builder engine and also with the appropriate commerce platforms in order to generate scripts and customized messages. The email content builder system database stores a variety of predetermined scripts. It will be understood by one of ordinary skill in the art that scripts are utilized by customer service representatives to respond to customer inquiries and concerns. A script is a general term for a written work detailing story, setting, and dialogue. However, a script is not limited to this definition and can be any basic predetermined question or response a customer service representative utilizes in serving a customer's needs. The script builder engine also allows modifications of the predetermined scripts in order to better respond to customer inquiries. These scripts ultimately land in customized email responses and messages that are sent to customers based upon various rules or parameters for each client. These rules can be based on order IDs, commerce platform data, geographical locations, country, currency, and customer IDs.

This approach has numerous benefits. First, better quality information is captured at the time the call is received. Second, agents will know immediately which platform to reference in assisting a customer. Third, call handle times will decrease because the number of cross-platform searches will be mostly eliminated. Lastly, new phone numbers will not have to be created to differentiate clients that are migrating (or have migrated) to platform "B."

It will be understood by those skilled in the art that commerce platforms often work integrally with ebusiness systems. Ebusiness systems utilize software scripts to provide an interface for ecommerce platforms. Many ecommerce companies have issues in this area, mainly the problem of too many scripts from ebusiness systems. This can be difficult to maintain and large scale changes take hundreds of hours to implement. Moreover, scripting overlap may be a problem. There are many scripts that have the same content, where the only differentiator is something trivial like the client name. Also, there is the issue of missing scripts. Not all scripts are available to every client who needs them. Additionally, the problem of quality has three sides. First, agents are allowed to select any script to handle any e-mail. Second, script changes may not be reflected across all scripts cloned for a particular client. Third, as clients migrate from platform "A" to platform "B," the probability of using the wrong script increases dramatically. A solution to this problem is to take scripts out of the ebusiness system and create a script builder engine. A single set of scripts will be required to handle the issues concerning most clients. The problems where the user utilizes client script A to handle the issue for client B are reduced. There is also automatic branding of general pool messages and a reduction in the number of queues and routing rules for clients who have standard service levels.

Furthermore, there are numerous issues concerning the future of reporting. Table 1 illustrates these issues, as well as solutions.

TABLE 1

Issue and Solutions with Email Content Builder

| Issue | Solution |
|---|---|
| Data quality. This can be broken down into the following points: Clients who have sites on platform "A" and platform "B" commerce platforms use the same phone numbers and e-mail addresses for customer service contacts. This causes a large number of offered contacts for one section and a large number of handled contacts in another section. Clients who have migrated to platform "B" use the same phone numbers and e-mail addresses for customer service contacts. This causes a large number of offered contacts for one section and a large number of handled contacts in another section. | Combine platforms into one platform. In this example, platform "A," platform "B," and platform "C" will be combined into "Combined Platform." This will eliminate many of the issues regarding platform crossover and migrations. |
| Geographic Locations: A particular contact center does not handle contacts for a particular site ID exclusively. A particular contact center does not handle contacts for a particular geographic region exclusively. The number of site ID's required platform "B" is not as great as the number of site ID's required on platform "A" Here, one site ID could encompass orders for all locales, not just one country or language. | Eliminate the geographic region designation for a client label, as well as the geographic region designation for a platform. Here, a client will have one line item instead of several. This will make reporting easier to execute, read, and understand. It will also eliminate a large amount of the clutter in reports. Breaking out data by contact center, language, country, and geographic region already exist through other means. |

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the web interface such that different communication protocols may be organized or designed differently while maintaining substantially the same functionality and without departing from the scope and spirit of the present invention.

What is claimed is:

1. A system for building an email message including a server with a processor and memory, comprising:
   a database stored in the server memory that is configured to receive data through a communication network from an electronic commerce platform, the database having stored therein one or more predetermined scripts containing predetermined dialogue content for an email responsive to a customer inquiry; and
   a software module containing program code which when executed by the processor in the server causes the server to perform operations of a script builder engine, the script builder engine utilizing the electronic commerce data when applying at least one rule from a rule set to modify the predetermined dialogue content of one of the predetermined scripts to generate a client specific email message that is ready for sending to a client.

2. The system of claim 1 wherein the script builder engine transforms scripts into email messages based on one or more client criteria stored in the database selected from a group consisting of: language, country, and currency.

3. The system of claim 1 wherein the script builder engine transforms scripts into email messages based on one or more client criteria stored in the database selected from a group consisting of: client identification codes (ID), order ID, department, and commerce platforms.

4. The system of claim 1 further comprising a rule generation module containing program code which when executed by the processor in the server causes the server to to enable a user through a user interface to the server to create a rule for the rule set that is utilized by the script builder engine in generating email messages from scripts.

5. The system of claim 1 wherein the database is operatively configured to receive data from more than one electronic commerce platform such that the script builder engine generates email messages for more than one electronic commerce platform from a single rule set and set of predetermined scripts.

6. A method for building an email message performed by a server having a processor and memory operating under the control of program code within a storage module, the method comprising steps of:
   receiving data from an electronic commerce platform and storing the received data in a database in the memory;
   storing in the memory one or more predetermined scripts in an email message system, each predetermined script containing predetermined dialogue for an email responsive to a customer inquiry; and
   generating by the server a client specific email message that is ready for sending to a client by utilizing the stored electronic commerce data when applying at least one rule from a rule set to modify the predetermined dialogue content of one of the stored predetermined scripts.

7. The method of claim 6 further comprising a step of sending the email message through a communication network to a client.

8. The method of claim 6 wherein the generating step comprises transforming by the server scripts into email messages based on one or more client criteria stored in the database in the server memory selected from a group consisting of: language, country, and currency.

9. The method of claim 6 wherein the generating step comprises transforming by the server scripts into email messages based on one or more client criteria stored in the database in the server memory selected from a group consisting of: client identification codes (ID), order ID, department, and commerce platforms.

10. The method of claim 6 further comprising a step of enabling a user through a user interface to the server to create a rule for the rule set that is utilized by the generating step in generating email messages from scripts.

11. The method of claim 6 wherein the receiving step comprises receiving data from more than one electronic commerce platform such that the generating step comprising generating by the server email messages for more than one electronic commerce platform from a single rule set and set of predetermined scripts.

* * * * *